(12) United States Patent
Li et al.

(10) Patent No.: US 6,208,780 B1
(45) Date of Patent: Mar. 27, 2001

(54) SYSTEM AND METHOD FOR OPTICAL MONITORING

(75) Inventors: Yuan Li, Duluth; Yan Wang, Norcross, both of GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/234,025

(22) Filed: Jan. 19, 1999

(51) Int. Cl.$^7$ .................................................. G02B 6/26

(52) U.S. Cl. ............................... 385/27; 385/39; 385/15

(58) Field of Search ............................... 385/15, 24, 27, 385/39

(56) References Cited

U.S. PATENT DOCUMENTS

| | | | |
|---|---|---|---|
| 5,596,661 | 1/1997 | Henry et al. | 385/24 |
| 5,680,490 | 10/1997 | Cohen et al. | 385/24 |
| 5,712,716 | * 1/1998 | Vanoli et al. | 359/125 |
| 5,852,505 | * 12/1998 | Li | 359/118 |
| 6,031,948 | * 2/2000 | Chen | 385/24 |

OTHER PUBLICATIONS

Kuznetsov, M. Cascaded Coupler Mach–Zehnder Channel Dropping Filters for Wavelength–Division–Multiplexed Optical Systems, Lightwave Technology, Journal of, vol. 12 Issue: 2, Feb. 1994 pp. 226–230.*

* cited by examiner

Primary Examiner—Rodney Bovernick
Assistant Examiner—Sarah U Song

(57) ABSTRACT

An optical filter, system, and method capable of detecting optical signals in an optical fiber trunk for purposes of diagnostics and control of a wavelength division multiplexing system using optical fiber network. The optical filter is described comprising a predetermined number N of cascaded Mach-Zender circuits having a predetermined transfer function with a predetermined scanning peak, the cascaded Mach-Zender circuits having an optical input and an optical output. In another embodiment, a system is provided which employs the optical filter in which a control circuit coupled to each of the Mach-Zender circuits to shift the scanning peak according to a predetermined criterion. The control circuit advantageously causes a phase shift in the Mach-Zender circuits, thereby allowing the optical filter to scan a predetermined frequency spectrum with a narrow pass band or scanning peak to determine the existence and/or the condition of optical signals within the predetermined frequency spectrum.

14 Claims, 5 Drawing Sheets

SYSTEM AND METHOD FOR OPTICAL MONITORING

CROSS-REFERENCE TO RELATED APPLICATIONS

Not applicable.

STATEMENT REGARDING FEDERALLY SPONSORED RESEARCH OR DEVELOPMENT

Not Applicable.

TECHNICAL FIELD

The present invention is generally related to optical monitoring and, more particularly, is related to a system and method for optical monitoring of multiple channels in a wavelength division multiplexing communications system.

BACKGROUND OF THE INVENTION

Network management in a communications network often requires information relative to the operation of the network. In the case of fiber optic communications networks, it is often desirable to know the precise condition of the optical signals transmitted through an optical fiber to perform channel diagnostics and to control the operation of the network. For example, in an optical fiber used to transmit up to sixteen channels or optical signals, certain information about each optical signal as it is transmitted through the optical fiber is important to ensure that the underlying information of the signal is relayed accurately.

For example, the actual channel presence is an important factor. This is important, for example, to inform a network monitor that a discontinuity has been created that prevents a single channel or multiple channels from being transmitted through the optical fiber. In such a circumstance, a network monitor function may be implemented that routes optical signals around the faulty pathway until the discontinuity is remedied.

Also, the power of each channel is another important factor used to maintain channel equalization. Specifically, the power of the optical signal over a channel may be affected by many different factors inherent in the optical network. In the case of a single fiber, different channels may operate at different power levels a which is undesirable due to the periodical use of optical amplifiers in an optical network and due to other factors. Determining the actual power of the optical signals in an optical fiber for each channel is important in order to determine necessary adjustments in performing channel equalization functions. Other important information may include the noise density across the various channels in an optical fiber as well as any frequency shift experienced by a particular channel.

SUMMARY OF THE INVENTION

The present invention provides for an optical filter, system, and method for detecting optical signals in an optical fiber trunk for purposes of diagnostics and control of a wavelength division multiplexing system using optical fiber network. According to one embodiment, an optical filter comprises a predetermined number N of cascaded Mach-Zender circuits, the optical filter having a predetermined transfer function with a predetermined scanning peak, the cascaded Mach-Zender circuits having an optical input and an optical output. In another embodiment, a system is provided which employs the aforementioned optical filter in which a control circuit is coupled to each of the Mach-Zender circuits that causes a phase shift in the Mach-Zender circuits, thereby allowing the optical filter to scan a predetermined frequency spectrum with the predetermined scanning peak to determine the existence and/or the condition of optical signals within the predetermined frequency spectrum.

In yet another embodiment, the present invention may be viewed as a method for monitoring optical signals in a wavelength division multiplexing system. This method comprises the steps of filtering an optical signal obtained from an optical fiber trunk in a wavelength division multiplexing system with a predetermined number N of cascaded Mach-Zender circuits having a predetermined transfer function with a predetermined scanning peak, the cascaded Mach-Zender circuits having an optical input and an optical output. The method further includes the steps of moving the scanning peak across a predetermined frequency band by adjusting the phase of an optical signal in a branch of each of the Mach-Zender circuits, and finally, measuring the optical signal at predetermined frequency points along the predetermined frequency band.

The present invention has numerous advantages, a few of which include, for example, an integrated optical filter and optical detector circuit which are without moving parts. In addition, the present invention is simple in design, user friendly, robust and reliable in operation, efficient in operation, and easily implemented for mass commercial production.

Other features and advantages of the present invention will become apparent to one with skill in the art upon examination of the following drawings and detailed description. It is intended that all such additional features and advantages be included herein as within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
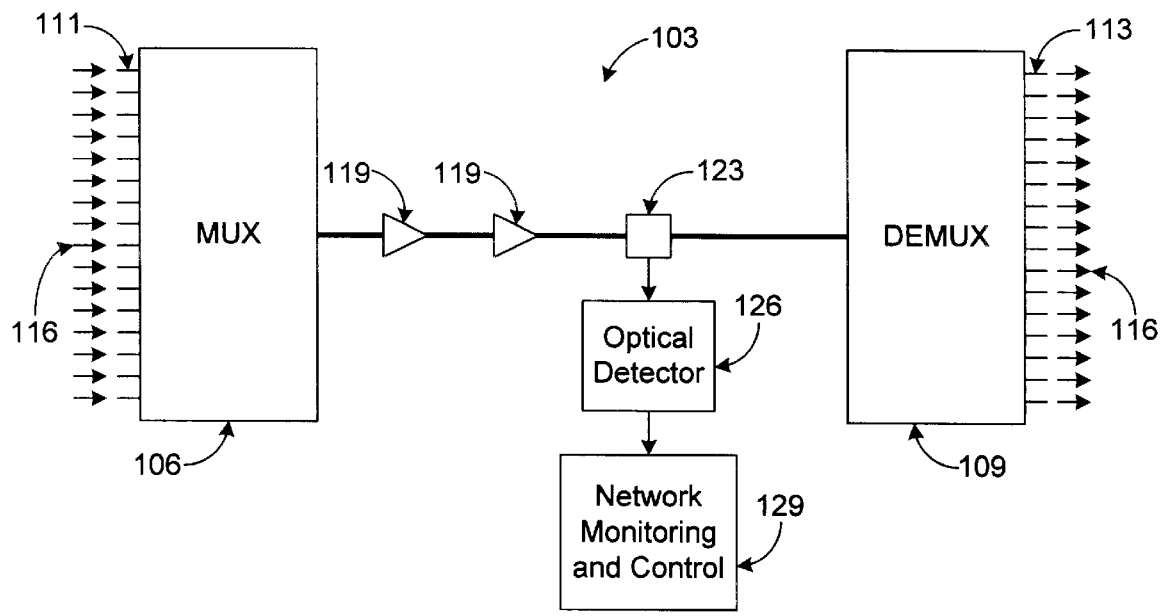
FIG. 1 is a block diagram of an optical communications network according to an embodiment of the present invention.

Turning to FIG. 1, shown is an optical communications network 100 according to an embodiment of the present invention. The optical communications network 100 includes an optical fiber trunk 103 that is optically coupled between an optical multiplexer 106 and an optical demultiplexer 109. The optical multiplexer 106 includes, for example, sixteen optical inputs 111 and the optical demultiplexer 109 includes, for example, sixteen optical outputs 113, although it is possible that any number of optical inputs and outputs 111 and 113 may exist. Each optical input 111 may receive and each optical output 113 may transmit an optical signal 116 to and from an extended optical network (not shown) of which the optical communications network is a part or branch.

The optical fiber trunk 103 includes optical amplifiers 119 or the like which boost an optical signal as it is transmitted through the optical fiber trunk 103. Imposed in the optical fiber trunk 103 is a tap 123 which may be an optical splitter, for example. The tap 123 is optically coupled to an optical detector circuit 126 used for network monitoring functions. The optical detector circuit 126 is in turn electrically coupled to network monitoring and control equipment 129.

In the general operation of the optical communications network 100, the optical multiplexer/demultiplexer 106/109 receives and transmits the optical signals 116 via the optical inputs and outputs 111 and 113 to and from predetermined destinations in the extended optical network. In other words, the optical signals 116 are transmitted through the optical fiber trunk 103 which is part of the route taken through the extended optical network. In fact, the extended optical network may comprise numerous optical communications networks 100 as well as other components. The tap 123 splits a portion of the optical signals 116 transmitted through the optical fiber trunk 103 and applies the split portion to the optical detector circuit 126. The optical detector circuit 126 determines the state of the optical signals 116 as will be discussed hereinafter, and provides this information to the network monitoring and control equipment 129 which then will adjust and control the amplification and general transmission of the optical signals 116 accordingly.

Figure 2:
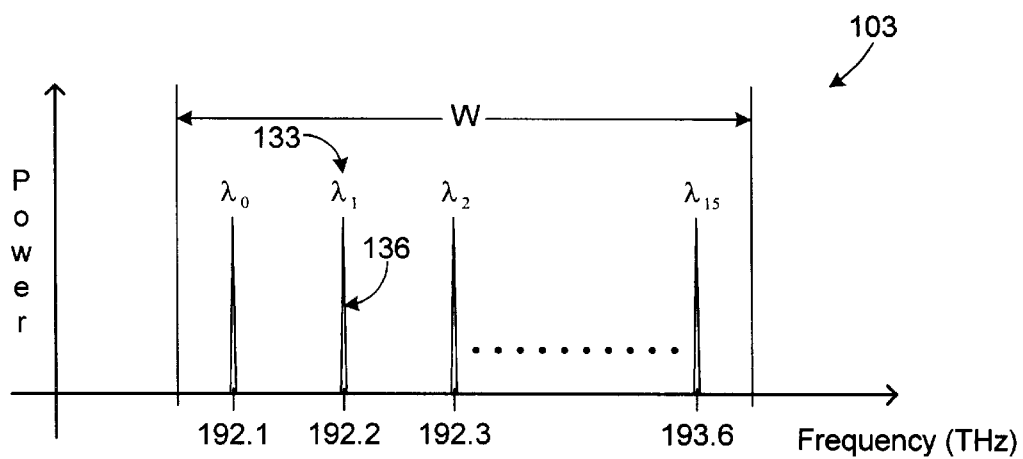
FIG. 2 is a graph of the frequency spectrum of the optical signals transmitted through an optical fiber trunk of the optical communications network of FIG. 1.

FIG. 2 is a graph of the power across a predetermined frequency spectrum for the optical signals 116 transmitted through the optical fiber trunk 103. When the optical signals 116 are transmitted through the optical fiber trunk 103, they are assigned to one of multiple channels 133. When an optical signal 116 is transmitted across a specific channel 133, a peak 136 appears in the frequency spectrum at predetermined center frequencies which are denoted by their wavelengths $\lambda_0, \lambda_1, \lambda_2, \ldots, \lambda_{15}$ that are allotted for the channels 133. Although only sixteen channels 133 which correspond to the number of inputs 111 and outputs 113 of the optical multiplexer and demultiplexer 106 and 109 are shown, it is understood that there may be any number of channels 133 limited by the optical transmission capabilities of the optical fiber trunk 103 and amplifiers. Each channel 133 is separated, for example, by approximately 0.1 Terahertz, although different frequency intervals may be employed as well. All of the channels 133 are contained within a predetermined frequency bandwidth W which may be, for example, approximately 191.05 THz to 193.65 THz as shown, although the predetermined frequency bandwidth W is not limited to this particular range of frequencies. The predetermined frequency bandwidth W generally defines a range of frequencies which are to be evaluated in order to monitor the transmission of the channels 133.

Note that not all of the peaks 136 may appear at any given time indicating that the corresponding channel 133 is not being used. Also, the peaks 136 may drift from their allotted frequency location which may result in unacceptable frequency intervals.

Figure 3A:
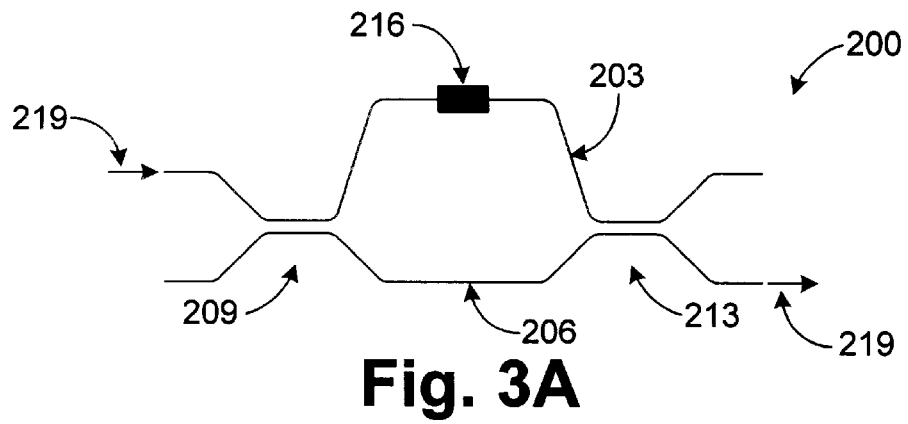
FIG. 3A is a schematic of a Mach-Zender circuit similar to those employed in an optical detector circuit the optical communications network of FIG. 1.

Referring next to FIG. 3A, shown is a Mach-Zender circuit 200 which comprises a first branch 203 and a second branch 206 which are coupled at a first optical coupler 209 and a second optical coupler 213 as is known in the art. The first and second branches 203 and 206 each comprise a waveguide with an effective index of refraction n which, for example, may be approximately equal to 1.455, although the actual value of the effective index of refraction n is application specific. Between the first and second optical couplers 209 and 213, the first branch 203 has a length $L_1$ and the second branch 206 has a length $L_2$, thereby defining a length difference $l = L_1 - L_2$.

The first branch 203 also includes, for example, a heater 216 which will alter the phase of an optical signal traveling through the first branch 203 in proportion to the temperature of the heater 216. Although a heater 216 is shown, it may be possible that the first branch includes other phase shifting devices in order to alter the phase of an optical signal traveling therethrough, such as and including the use of an electric field or magnetic field, etc., as discussed in U.S. Pat. No. 5,502,781, issued to Li et al.

Accordingly, an optical signal 219 enters a port of either the first branch 203 or the second branch 206 of the Mach-Zender circuit 200 and exits out of a port of the branch which opposes the one entered. However, it may also be possible that the optical signal exits out of the same it branch entered depending upon any phase difference imposed by the heater 216 and the length difference l, as well as other factors known in the art.

Figure 3B:
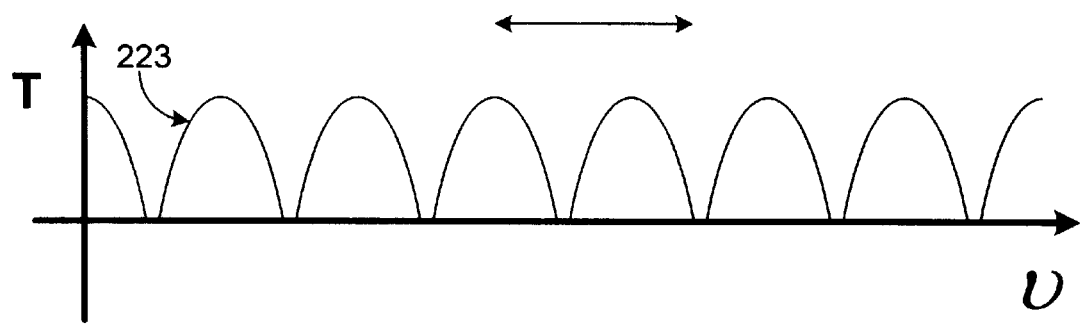
FIG. 3B is a graph of the transfer function of the Mach-Zender circuit of FIG. 3A.

With reference to FIG. 3B, shown is a graph of the transfer function T(υ) of the Mach-Zender circuit 200 (FIG. 3A) where $$T(\upsilon) = (t(\upsilon))^2 = \frac{P_{OUT}(\upsilon)}{P_{IN}(\upsilon)},$$

where υ is the optical frequency of the optical signal 219 (FIG. 3A). $P_{IN}(\upsilon)$ and $P_{OUT}(\upsilon)$ are defined as the power of the optical signal 219 (FIG. 3A) entering and leaving the Mach-Zender circuit 200, respectively, and, $$t(\upsilon) = \cos\left(\frac{2\pi n l \upsilon}{C}\right),$$

where n is the effective index of refraction of the waveguide of the first and second branches 203 (FIG. 3A) and 206 (FIG. 3A), l is defined as the length difference between the first and second branches 203 and 206 of the Mach-Zender circuit, and C is the speed of light. The wide periodic peaks 223 of the transfer function may be shifted up and down the frequency spectrum by manipulating the heater 216 (FIG. 3A) or other phase shifting device.

Figure 4A:
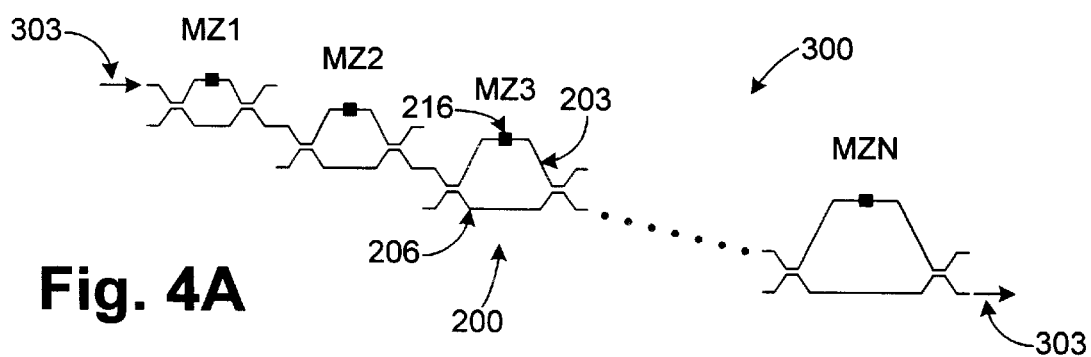
FIG. 4A is a schematic of an optical filter employed in the optical detector circuit in the optical communications network of FIG. 1.

Turning next to FIG. 4A, shown is an optical filter 300 according to an embodiment of the present invention. The optical filter comprises a predetermined number N of cascaded Mach-Zender circuits 200 (FIG. 3A) which are labeled MZ1, MZ2, MZ3, . . . , MZN. The cascaded Mach-Zender circuits 200 are coupled in series using single port connections as shown. An optical signal 303 enters a first Mach-Zender circuit MZ1 on one side of the optical filter 300 and exits out of the last Mach-Zender circuit MZN. For each $i^{th}$ successive cascaded Mach-Zender circuit MZ1, MZ2, MZ3, . . . , MZN, the length difference $l_i$ may increase, for example, according to the equation $l_i = l_1 \times 2^{i-1}$, where i=1, 2, 3, . . . , N. Conversely, the length difference $l_i$ may decrease, for example, where each $i^{th}$ successive cascaded Mach-Zender circuit MZ1, MZ2, MZ3, . . . , MZN has a length difference $l_i$ defined by the equation $l_i = l_N \times 2^{N-i}$, where i=1, 2, 3, . . . , N, in which the optical filter 300 includes Mach-Zender circuits MZ1, MZ2, MZ3, . . . , MZN placed in the reverse order. In addition, the Mach-Zender circuits MZ1, MZ2, MZ3, . . . , MZN may also be cascaded in any random order other than the consecutive arrangements described above. Also, the actual length differences $l_i$ may be, for example, 50 um, 100 um, 200 um, 400 um, 800 um, 1600 um, and 3200 um, etc., although other length differences $l_i$ may be employed.

Figure 4B:
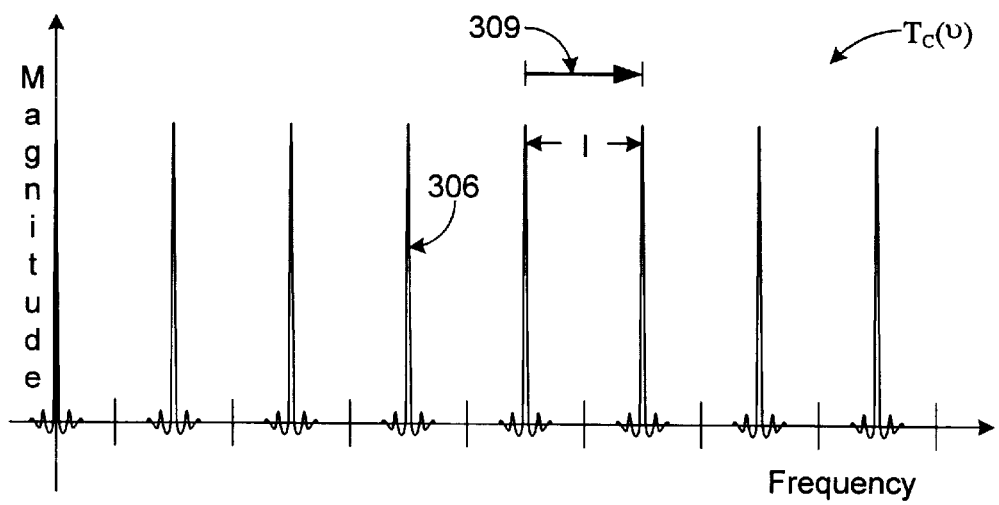
FIG. 4B is a graph of the transfer function of the optical filter of FIG. 4A.

FIG. 4B is a graph of the transfer function $T_C(\nu)$ of the optical filter 300 (FIG. 4A). The transfer function $T_C(\nu)$ is defined by the equation $$T_C(\nu) = [\cos(2^0 x) \times \cos(2^1 x) \times \cos(2^2 x) \times \ldots \times \cos(2^{N-1} x)]^2,$$

$$\text{where } x = \frac{2\pi n \nu l}{C},$$

n is the effective index of refraction of the waveguide of the first and second branches 203 (FIG. 4A) and 206 (FIG. 4A) of the Mach-Zender circuits 200, $\nu$ is the optical frequency of the optical signal 303 (FIG. 4A), C is the speed of light, l is the length difference of the smallest Mach-Zender circuit 200 (the smallest length difference), and, once again N is the total number of cascaded Mach-Zender circuits 200, which may also be defined as the order of the optical filter 300. Note that the transfer function $T_C(\nu)$ applies to any optical filter 300 regardless of the particular order of the Mach-Zender circuits 200.

The graph of the transfer function $T_C(\nu)$ shows periodic peaks 306 which are separated by a predetermined frequency interval I which may determined according to the equation $$\frac{C}{2nl},$$

where C, n, and l are defined as above, and $$\frac{2\pi n \nu 1}{C} = \pi.$$

Note that by altering the phase using the phase shifting device such as heaters 216, the peaks 306 can be caused to shift a predetermined shift distance 309. The present invention advantageously includes a frequency interval I that is greater than or equal to the predetermined frequency bandwidth W (FIG. 2) defining the range of frequencies which are evaluated in order to monitor the transmission of the channels 133 (FIG. 2).

In addition, it is possible that multiple cascaded optical filters 300 be employed, which results in an overall transfer function $T_C(\nu)$ of even sharper periodic peaks 306. However, generally a signal power loss of 3 dB may occur with each cascaded optical filter 300. Consequently, a tradeoff exists between the precision of the periodic peaks 306 achieved with a greater number of cascaded optical filters 300 and the efficiency associated with the overall cascaded filter. Also, a single optical filter 300 or a number of cascaded optical filters 300 can be doubled by placing a mirror at the output of the single optical filter 300 or cascaded optical filters 300 and reflecting an optical signal through the same optical filter(s) 300 twice.

Figure 4C:
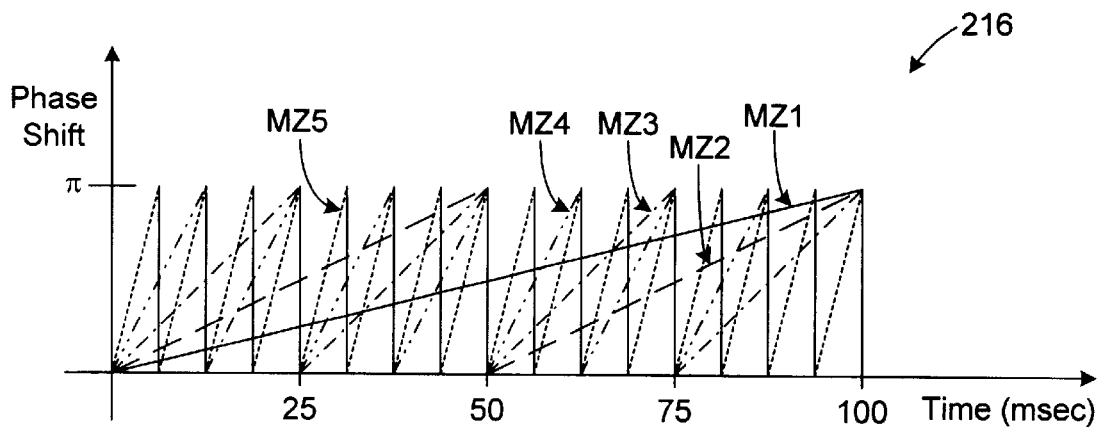
FIG. 4C is a graph of a phase shift of the transfer function for each Mach-Zender circuit of the optical filter of FIG. 4A.

FIG. 4C is a graph of the power applied to the heaters 216 causing a corresponding phase shift versus time for an exemplary $5^{th}$ order optical filter 300 (FIG. 4A) with Mach-Zender circuits MZ1, MZ2, MZ3, MZ4, and MZ5 (FIG. 4A) where N is equal to 5. The maximum power applied to any one of the heaters 216 that is necessary to cause a phase shift of $\pi$ may vary depending on the nature of the heaters 216 employed in the optical filter 300. In general, the power applied to each heater 216 is cyclic in nature, where each power cycle has a "saw tooth" shape. The cycle period of the heater power cycle of each particular Mach-Zender circuit MZ1, MZ2, MZ3, MZ4, and MZ5 decreases with each successive cascaded Mach-Zender circuit MZ1, MZ2, MZ3, MZ4, and MZ5. For example, Mach-Zender circuits MZ1 through MZ5 have respective heat cycle periods of approximately 100 ms, 50 ms, 25 ms, 12.5 ms, and 6.25 ms. Thus, the periodic peaks 306 (FIG. 4B) of the transfer function $T_C(\nu)$ (FIG. 4B) are preferably shifted by the predetermined shift distance 309 with the tolling of the longest heater cycle, which in the present case is the heater cycle of the Mach-Zender circuit MZ1.

Figure 5:
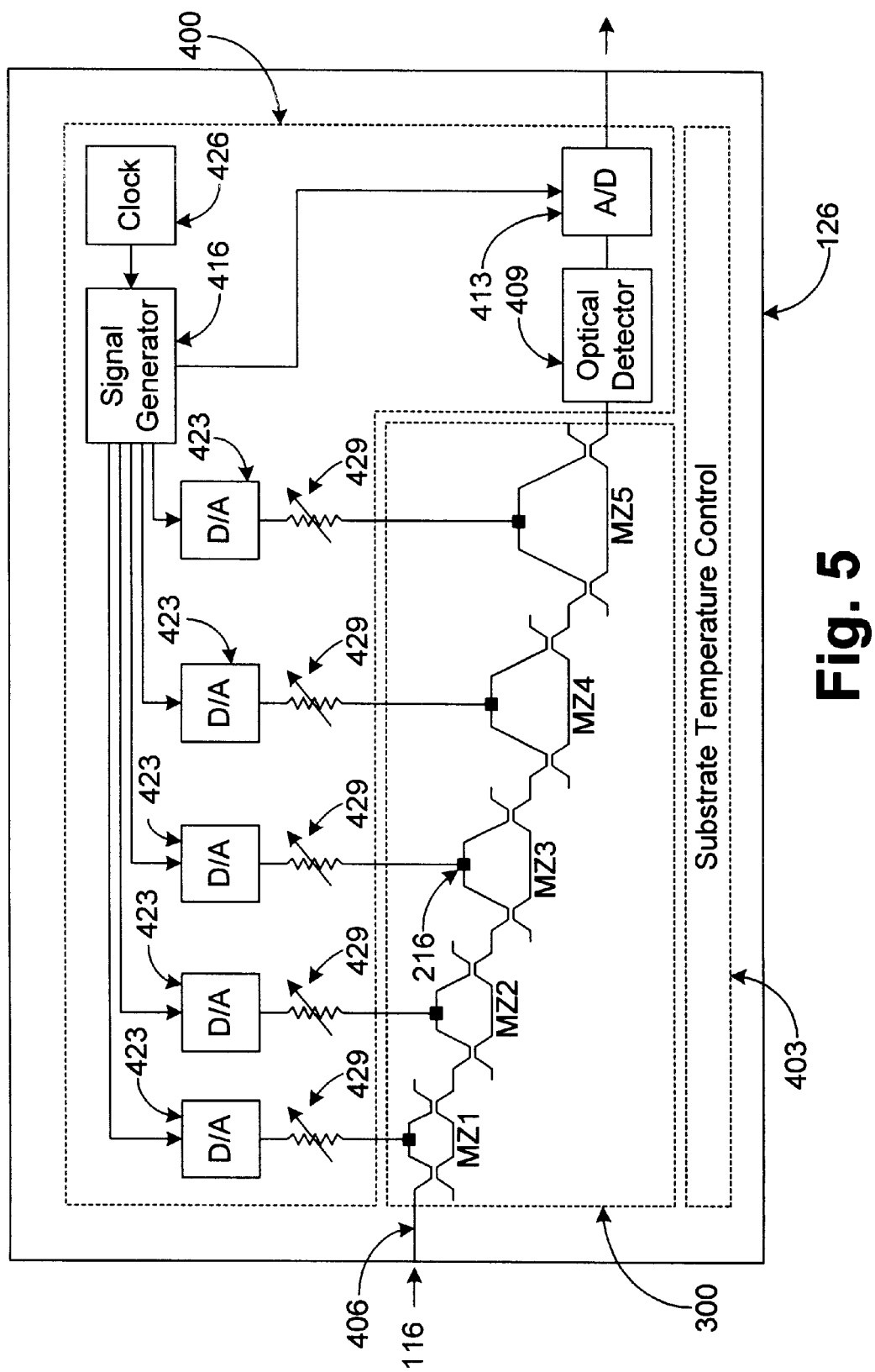
FIG. 5 is a block diagram of an optical detector circuit employed in the optical communications network of FIG. 1.

FIG. 5 depicts the optical detector circuit 126 according to an embodiment of the present invention. The optical detector circuit 126 includes the optical filter 300, a control circuit 400, and a substrate temperature control 403. The optical filter 300 is a fifth order filter as described with regard to FIG. 4A, including five Mach-Zender circuits MZ1, MZ2, MZ3, MZ4, MZ5, each Mach-Zender circuit having a heater 216. It is understood, as discussed previously, that a greater number of Mach-Zender circuits may be employed than are shown. The optical detector circuit 126 includes an optical input 406 which is also the in input to the optical filter 300.

The control circuit 400 includes an optical detector 409 with an optical input coupled to the output of the optical filter 300. The optical detector 409 has an electrical output coupled to an analog input of an analog-to-digital (A/D) converter 413. The A/D converter 413 includes a digital output which is also the digital output of the optical detector circuit 126 for coupling to the network monitoring and control equipment 129 (FIG. 1). The A/D converter 413 also includes a trigger input to receive a trigger signal which causes the A/D converter 413 to receive and convert an analog signal applied at the analog input of the A/D converter 413 into a digital signal.

The control circuit 400 further includes a signal generator 416 with several heater signal outputs that are coupled to a number of digital-to-analog (D/A) converters 423. The signal generator 416 also has a trigger output which is coupled to the trigger input of the A/D converter 413, as well as a clock input which is coupled to an output of a clock 426. The D/A converters 423 each have an analog output coupled to a variable resistor 429 which in turn is coupled to the respective heaters 216 of the Mach-Zender circuits MZ1, MZ2, MZ3, MZ4, MZ5.

The optical detector circuit 126 may be, for example, an integrated optical-electrical circuit which ensures durability, reliability, and may be manufactured using microelectronics techniques. Note, however, that the optical detector circuit 126 may comprise other non-integrated circuits and components.

The general operation of the optical detector circuit 126 is described as follows. The control circuit 400 is designed to take discrete measurements of the frequency spectrum of the optical signal 116 from the optical fiber trunk 103 during a scan across a predetermined frequency band within which the optical signals 116 are transmitted using the optical filter 300. The optical signal 116 is received from the optical fiber trunk 103 and is applied to the optical input of the optical detector circuit 126. The optical filter 300 filters the optical signal 116 according to the state of the heaters 216 which are controlled by the control circuit 400. The state or temperature of the individual heaters 216 depends upon the output of the signal generator 416 which generates a heater power signal for each heater 216 which is a discrete or digital representation of the "saw tooth" power signals discussed with reference to FIG. 4C. These discrete heater power signals may be stored, for example, in memory associated with the signal generator 416. At any given time, corresponding samples of the discrete heater power signals are transmitted to each of the heaters 216 via the D/A converters 423 and the variable resistors 429 to control the state of the transfer function $T_C(\upsilon)$ (FIG. 4B) of the optical filter 300. By progressively changing the discrete heater power signals according to the graph of FIG. 4C, the transfer function $T_C(\upsilon)$ (FIG. 4B) of the optical filter 300 is caused to shift in discrete steps across the channels 133 (FIG. 2).

The signal generator 416 moves to the next discrete heater power signal for each heater 216 upon receiving a timing pulse from the clock 426. That is to say, the clock 426 is designed to deliver timing pulses to the signal generator 416 which cause the signal generator 416 to advance to the next signal generator output for each heater 216. In this manner, the optical filter 300 scans across discrete frequencies of the predetermined frequency band W (FIG. 2). The timing pulses from the clock 426 are spaced apart in time to allow the heaters 216 to adjust to the new heater power levels and achieve a state of equilibrium. At a time between each timing pulse from the clock 426 when the heaters 216 are settled at the new heat level or have reached equilibrium, the signal generator 416 sends a trigger pulse to the A/D converter 413 which converts the analog signal received from the optical detector 409 into a digital value that is provided to the network monitoring and control equipment 129. Note that the variable resistors 429 are tuned to achieve a predetermined specific impulse response by the heaters 216, the predetermined specific impulse response being application specific.

The optical detector circuit 400 takes the discrete measurements of the channels 133 of the optical signals 116 until the last frequency is reached in the predetermined frequency band. At that time, the scan may be repeated either automatically or upon a specific enabling command received from the network monitoring and control equipment 129. Note that the substrate temperature control 403 maintains the overall temperature of the entire optical detector circuit 126 as known in the art.

Figure 6:
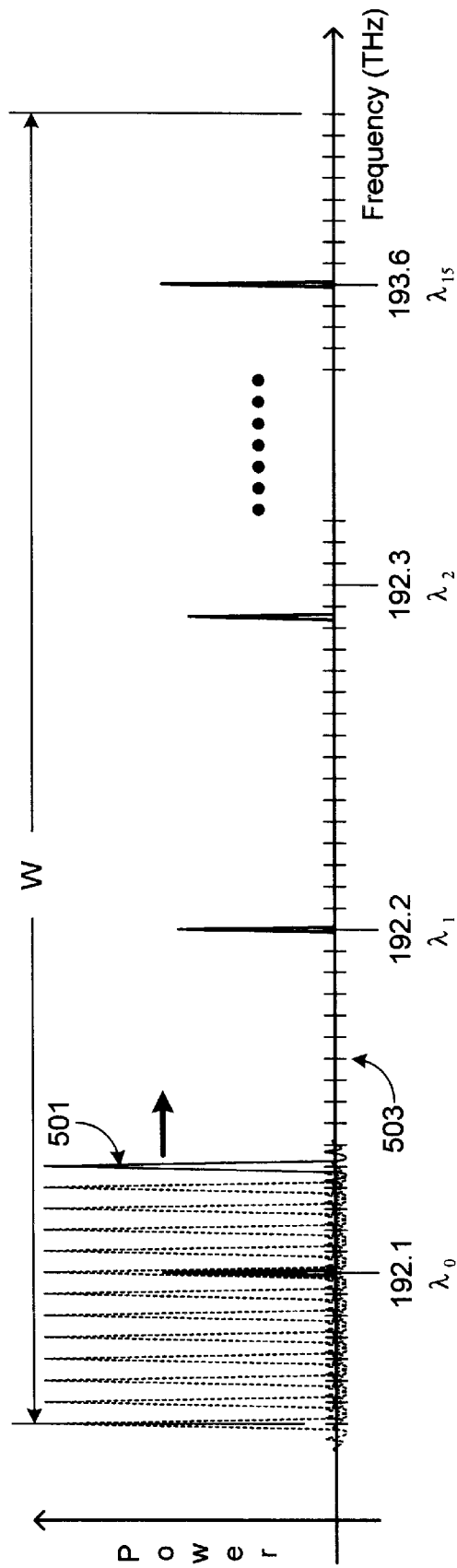
FIG. 6 is a graph of the frequency spectrum of the optical signals transmitted through an optical fiber trunk of the optical communications network of FIG. 1 with a superimposed peak from the transfer function of the optical filter of FIG. 4A.

Finally, with reference to FIG. 6, shown is the predetermined frequency bandwidth W with a superimposed scanning peak 501 which is actually one of the periodic peaks 306 of the transfer function $T_C(\upsilon)$ (FIG. 4B) of the optical filter 300. The scanning peak 501 moves across the predetermined frequency bandwidth W in discrete frequencies 503 based on the heater powers applied at a given time. In this manner, the center frequency and amplitude of the peaks 136 corresponding to each channel are determined. Such information is then used in the control of the optical communications network 100 (FIG. 1).

Many variations and modifications may be made to the above-described embodiment(s) of the invention without departing substantially from the spirit and principles of the invention. All such modifications and variations are intended to be included herein within the scope of the present invention.

Therefore, having thus described the invention, at least the following is claimed:

1. An optical filter, comprising a plurality N of cascaded Mach-Zender circuits that provide phase shifts whose magnitudes have binary relationship to each other, coupled together using a plurality of single port connections, the optical filter configurable with a determinable transfer function having a resultant peak, the cascaded Mach-Zender circuits having an opitical input and an optical output.

2. The optical filter of claim 1, wherein each of the Mach-Zender circuits includes a first branch of length $L_1$ and a second branch of length $L_2$, the first and second branches having a length difference l where $l=L_1-L_2$, and, the relationship of the length difference $l_i$ of each $i^{th}$ Mach-Zender circuit to the smallest length difference $l_1$ of the smallest Mach-Zender circuit is approximately determined by the equation $l_i=l_1\times 2^{i-1}$, where $i=1, 2, 3, \ldots, N$.

3. The optical filter of claim 2, wherein the Mach-Zender circuits are arranged in the cascaded relationship in a random order.

4. The optical filter of claim 2, wherein the Mach-Zender circuits are arranged in the cascaded relationship in an order according to the length difference $l_i$ of each Mach-Zender circuit.

5. The optical filter of claim 1, wherein the transfer function T is determinable from the form $$T_C(\upsilon) = [\cos(2^0 x) \times \cos(2^1 x) \times \cos(2^2 x) \times \ldots \times \cos(2^{N-1} x)]^2,$$

$$\text{where } x = \frac{2\pi n \upsilon l}{C},$$

n is the effective refractive index of a waveguide employed in the Mach-Zender circuits, $\upsilon$ is an optical frequency of laser beam passing though the cascaded Mach-Zender circuits, l is the smallest length difference of the Mach-Zender circuits, and C is the speed of light.

6. The optical filter of claim 1, wherein each of the cascaded Mach-Zender circuits further comprises:

a first branch of length $L_1$;

a second branch of length $L_2$; and a heater element disposed in the first branch, wherein a phase of an optical signal passing through the first branch relative to an optical signal passing through the second branch is substantially altered in proportion to a temperature increase of the heater element.

7. A system for monitoring optical signals in a wavelength division multiplexing system, comprising:

a plurality N of cascaded Mach-Zender circuits that provide phase shifts whose magnitudes have binary relationship to each other, having a determinable transfer function with a resultant peak, the cascaded Mach-Zender circuits having an optical input and an optical output; and a control circuit coupled to each of the Mach-Zender circuits to shift the peak according to a determinable criterion.

8. The system of claim 7, wherein each of the Mach-Zender circuits includes a first branch of length $L_1$ and a second branch of length $L_2$, the first and second branches having a length difference l where $l=L_1-L_2$, and, the relationship of the length difference $l_i$ of each $i^{th}$ Mach-Zender circuit to the smallest length difference $l_1$ of the smallest Mach-Zender circuit is approximately determined by the equation $l_i=l_1 \times 2^{i-1}$, where i=1, 2, 3, . . . , N.

9. The optical filter of claim 8, wherein the Mach-Zender circuits are arranged in the cascaded relationship in a random order.

10. The optical filter of claim 8, wherein the Mach-Zender circuits are arranged in the cascaded relationship in an order according to the length difference $l_i$ of each Mach-Zender circuit.

11. The system of claim 7, wherein the transfer function T is determinable from the form $$T_C(\upsilon) = [\cos(2^0 x) \times \cos(2^1 x) \times \cos(2^2 x) \times \ldots \times \cos(2^{N-1} x)]^2,$$

$$\text{where } x = \frac{2\pi n \upsilon l}{C},$$

n is the effective refractive index of a waveguide employed in the Mach-Zender circuits, $\upsilon$ is an optical frequency of a laser beam passing though the cascaded Mach-Zender circuits, l is the smallest length difference of the Mach-Zender circuits, and C is the speed of light.

12. The system of claim 7, wherein each of the cascaded Mach-Zender circuits further comprises:

a first branch of length $L_1$;

a second branch of length $L_2$; and a heater element disposed in the first branch, wherein a phase of an optical signal passing through the first branch relative to an optical signal passing through the second branch is altered in proportion to a temperature of the heater element.

13. A system for monitoring optical signals in a wavelength division multiplexing system, comprising:

a determinable number of cascaded optical filters having a plurality N of cascaded Mach-Zender circuits that provide phase shifts whose magnitudes have a binary relationship to each other, each of the optical filters having a determinable transfer function with a resultant peak, the cascaded optical filters having an optical input and an optical output; and a control circuit coupled to each of the Mach-Zender circuits to shift the peak according to a determinable criterion.

14. A method for monitoring optical signals in a wavelength division multiplexing system, comprising the steps of:

filtering an optical signal obtained from an optical fiber trunk in a wavelength division multiplexing system with a plurality N of cascaded Mach-Zender circuits that provide phase shifts whose magnitudes have a binary relationship to each other, having a determinable transfer function with a resultant peak, the cascaded Mach-Zender circuits having an optical input and an optical output;

moving the peak across a determinable frequency band by adjusting the phase of an optical signal in a branch of each of the Mach-Zender circuits; and measuring the optical signal at predetermined frequency points along the predetermined frequency band.

* * * * *